Patented June 28, 1938

2,122,016

UNITED STATES PATENT OFFICE 2,122,016

PRODUCTION OF CARAMEL COATINGS AND THE LIKE

William W. Stokes, Seattle, Wash., assignor to Washington Chocolate Company, Seattle, Wash., a corporation of Washington No Drawing. Application November 5, 1934, Serial No. 751,582

7 Claims. (Cl. 99—134)

My invention relates to the manufacture of coatings, such as are employed by confectioners, bakers, and ice cream manufacturers. It comprises a new process for the manufacture of such coatings and for the manufacture of products from which such coatings, and other edibles, can be made, and the new product thereby produced.

The primary object of my invention is to produce a coating, or a product from which a coating can be produced, which will have a distinctive and a true caramel flavor. Its use is not, however, limited only to the manufacture of coatings, as will appear hereafter.

More specifically it is an object of the invention to provide a process and the resulting product, which product will be in a dry, usually in powdered, form, in which form it will have an inherent, distinctive, and true caramel flavor, and from which dry or powdered product coatings or other products can be made as required, which products (coatings, for example) in turn will have a caramel flavor imparted to them, and which coatings can be employed in the normal way in which coatings are regularly employed, and for the various uses to which coatings are adapted.

My invention comprises the novel process and the novel product resulting from such process, as will appear in this specification, and as will be more particularly pointed out and defined in the claims at the end of the specification.

It has long been desired by confectioners, bakers, manufacturers of ice cream bars, and the like, to provide a coating for their products which will have a distinctive caramel flavor, but caramel is produced by cooking together products in which milk and sugar are incorporated, and when the mixture is caramelized it becomes tacky or may become hard. Such products are typified by the caramel squares sold by candy shops, and this tacky product has not heretofore been successfully combined with fats in such a way that the resulting product can be handled and applied like a coating. Synthetic or artificial caramel has not the true flavor, for such flavor can only be obtained by cooking together milk and sugar.

According to my invention I provide, for the first time so far as I am aware, a product which can be employed in dry or powdered form for mixture with fats, such as cocoanut butter, to produce a coating which can be handled in all respects like any other coating, for instance like a chocolate coating, and which has the true caramel flavor.

The dry powder is made by mixing together liquid milk and sugar each as hereinafter defined, and cooking them together until the mixture reaches a desired cook, and depending upon the flavor desired, this may be to a catch, a medium hard ball, a hard ball, or a crack, or even above a crack, and thereafter taking the mixture and working it, for example in a confectioner's mixer, under conditions which facilitate graining, and preferably also the elimination of moisture, until the mass first becomes dry and then grains and powders. Agitation hastens the powdering or graining of the cooked mixture. The lighter the cook the less pronounced is the caramel flavor, and the lighter the color. The caramel flavor is regulated entirely by the amount of cook thus given the milk and sugar.

The terms "milk" or "liquid milk", as herein used, are employed in the broad sense, without restriction as to the presence or absence of butter fat, or the ratio of butter fat to solids not fat, and without restriction as to whether it is whole milk, skim milk, partially condensed, or concentrated milk. To accomplish the cooking, however, water must be present, and if powdered milk is used, water must be added. Similarly the term "sugar" is employed in the broad sense, to designate any sweetening agent such as is employed by confectioners.

The proportions of milk and sugar will naturally vary in accordance with the uses to which the powder is to be put and with the desire of the manufacturer. I have obtained excellent results by mixing together 150 pounds of sugar and 100 pounds of whole milk containing 50% total solids and 50% water. This is approximately a four to one milk, that is, a milk reduced to one-fourth its original bulk by evaporation or concentration. As I have stated, however, these proportions, the degree of concentration of the milk, if concentrated at all, and the ratio of solids in the milk to the water, can be varied within wide limits. Such a mixture I place in an open kettle, where it is cooked, meanwhile stirring it to prevent it sticking to the pan or kettle. The cooking is continued, the time varying with the amount of water present, with the proportions of the ingredients, the total quantity of the batch, and the strength of flavor or color desired, until it comes to a catch, a soft ball, a medium or hard ball, or a crack, as required. It is now caramelized, and has the true caramel flavor which can only be obtained by cooking together milk and sugar.

The mixture is then preferably removed from the kettle and placed in a mixer, where it is worked, meanwhile being heated to eliminate moisture, and later to grain and later to powder the batch or mixture. It is not essential that any particular type of apparatus be employed, and by the term "working" I intend to imply only that there is constant agitation tending to grain the mixture. Furthermore, while it is convenient to employ heat to eliminate the moisture, the elimination of moisture may be facilitated by the employment of vacuum, and depending upon the degree of vacuum employed, the heat may be greater or less. The graining action will be the same.

The caramelized mixture is thus worked, the time depending upon the conditions, the amount of moisture remaining, and the total quantity of the batch, until it begins to break apart, and finally it will grain and powder. This powder has little or no free moisture in it, and in this condition can be stored for considerable periods of time. It is tan in color, and is caramel-flavored, according to degree of cooking. In the example given above, the caramel powder produced contains approximately 75% sugar and 25% whole milk solids.

The powder can immediately or at a subsequent time be employed in the manufacture of coatings. In making coatings from it the caramel powder would normally be added to a small quantity of a melted fat, such as cocoanut butter, though depending upon the use to which it is to be put and the quality of coating desired, other fats, for instance cocoa butter, may be substituted, in part or wholly, for the cocoanut butter. When the mixture of caramel powder and fat is complete, in the form of a doughlike mass, (this mixture taking place preferably in a melanger, then going through a refiner) the refined mixture is then added to the remainder of the fat, previously melted, in stirring kettles, and the coating is completed in the normal manner. This coating is light or dark in color, depending upon the degree of cooking in preparing the powder, and has the true, inherent caramel flavor. It can be made with fats of low melting point, and distributed in liquid form in cans, or by the use of fats of higher melting point it can be formed into slabs. It can be thinned out as desired, and in all ways can be used and handled as any other coating material, for instance, in melted, grated, or shaven form, yet it has, and retains indefinitely, its distinctive and true caramel flavor.

The caramel powder, having a distinctive caramel flavor, may be eaten in this form or used otherwise than in the production of coatings (for instance, as a flavoring medium for incorporation in cream centers, in cake icings and for other bakery uses, for soda fountain uses, for toppings, syrups, etc.), hence I do not intend by the claims to be restricted only to the employment of this caramel powder in coatings. By the addition of milk and butter, the powder can be used in the manufacture of butterscotch or toffee, and other flavoring substances can be employed in addition.

The distinctive feature of this invention lies in the steps succeeding the caramelizing of the milk and sugar, and in the production from the caramelized milk and sugar of a dry or powdered substance having the true caramel flavor.

What I claim as my invention is:

1. A process of producing a product for use in the manufacture of coatings and the like, which comprises cooking together milk and sugar to caramelize the mixture, and thereafter drying and working the mixture until it grains and assumes a dry form.

2. A process of producing an intermediate product useful in the manufacture of coatings and the like, which consists in cooking together milk and sugar until it has been caramelized, and thereafter working the mixture in the presence of heat to eliminate moisture, until it grains and assumes a powdered form.

3. A process of producing a product for use in the manufacture of coatings and the like, which consists in mixing sugar and liquid milk in such proportions as will leave, in the final dry product, substantially 75% sugar and 25% whole milk solids, cooking the mixture until it has been caramelized, and finally working the mixture in the presence of heat to eliminate moisture, and until the product grains and assumes a powdered form.

4. A process of manufacturing a true caramel flavored coating or the like, comprising, first, cooking together milk and sugar to caramelize the mixture; second, working and drying the caramelized mixture until it grains, to form a powder; and third, as and when desired thereafter combining the powder with a melted fat.

5. A process of producing an intermediate product useful in the manufacture of coatings and the like, which consists in cooking together milk and sugar until the mixture is caramelized, and thereafter working the resultant product under reduced pressure to eliminate moisture, until it grains and assumes a powdered form.

6. A homogeneous product for use in making coatings, consisting essentially of a caramelized combination of milk and sugar, in powder form, distinguished by its inherent and lasting true caramel flavor.

7. A coating comprising a fat, as a vehicle, having incorporated therein a powder consisting essentially of a caramelized combination of milk and sugar having an inherent true caramel flavor.

WILLIAM W. STOKES.